US006208768B1

(12) United States Patent
Pandel et al.

(10) Patent No.: US 6,208,768 B1
(45) Date of Patent: *Mar. 27, 2001

(54) METHOD FOR PROCESSING PICTURE ELEMENTS OF AN IMAGE SEGMENT WITH A COMPUTER

(75) Inventors: Juergen Pandel, Feldkirchen-Westerham; Andre Kaup, Hoehenkirchen, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,364

(22) Filed: Mar. 13, 1997

(30) Foreign Application Priority Data

Mar. 13, 1996 (DE) .............................................. 196 09 860

(51) Int. Cl.[7] ...................................................... G06K 9/32
(52) U.S. Cl. ........................... 382/300; 382/232; 382/266
(58) Field of Search ..................................... 382/274, 242, 382/243, 300, 266, 269, 293, 294, 295, 296, 297, 298, 299, 232, 268

(56) References Cited

U.S. PATENT DOCUMENTS

| 4,771,471 | * | 9/1988 | Kitamura | 382/269 |
| 4,776,031 | * | 10/1988 | Mita | 382/323 |
| 5,020,119 | * | 5/1991 | Tai et al. | 382/269 |
| 5,054,100 | * | 10/1991 | Tai | 382/300 |
| 5,091,973 | * | 2/1992 | Watanabe | 382/269 |
| 5,093,870 | * | 3/1992 | Watanabe | 382/300 |
| 5,602,654 | * | 2/1997 | Patti et al. | 358/461 |
| 5,717,793 | * | 2/1998 | Ushida et al. | 382/298 |

FOREIGN PATENT DOCUMENTS

4136636 A1   7/1993   (DE) .

OTHER PUBLICATIONS

Signal Processing: Image Communication 1 (1989) pp. 153–180, "Coding of Arbitrarily Shaped Image Segments Based on a Generalized Orthogonal Transform", Gilge et al.
R.J. Clarke, "Orthogonal Transform Coding of Images", Academic Press, London S. 72–134 (1985).
Proc. of the IEEE, vol. 73, No. 4, S. 549–573, "Second Generation Image–Coding Techniques", Apr. 1985.
IEEE Transactions on Circuits and Systems for Video Technology, vol. 5, No. 1, Feb. 1995, "Shape–Adaptive DCT for Generic Coding of Video", Sikora et al., S. 59–62.
IEEE Tranactions on Circuits and Systems for Video Technology, vol. 5, No. 3, Jun. 1995, "Efficiency of Shape–Adaptive 2–D Transforms for Coding of Arbitrarily Shaped Image Segments", Sikora et al., S.–254–258.

* cited by examiner

Primary Examiner—Leo H. Boudreau
Assistant Examiner—Gregory Desire
(74) Attorney, Agent, or Firm—Schiff Hardin & Waite

(57) ABSTRACT

Brightness values of picture elements of an image segment are subjected to a conformal imaging, so that the brightness values of the picture elements that are located at an edge of the image segment are imaged onto picture elements of an edge of a target image segment having a prescribable shape. Interpolation of the brightness values is undertaken between the imaged brightness values of the target image segment.

10 Claims, 6 Drawing Sheets

METHOD FOR PROCESSING PICTURE ELEMENTS OF AN IMAGE SEGMENT WITH A COMPUTER

BACKGROUND OF THE INVENTION

1. Field of the Invention

The present invention relates generally to the field of processing video information, and, more particularly, the present invention relates to an improved device and method of processing video display signals.

2. Description of the Related Art

The encoding of video signals in accordance with the image encoding standards H.261, H.263, MPEG1 as well as MPEG2 is often based on a block-oriented discrete cosine transformation (DCT). These block-oriented encoding methods, however, are not suitable for image encoding methods that are no longer based on rectangular blocks. For example, subjects from an image may be segmented and the segments of the image are encoded. These methods are referred to as region-based or subject-based image encoding methods. A segmenting of digital images thereby takes place according to the subjects occurring in the scene. A separate encoding of these segmented subjects is implemented instead of encoding the image blocks as in block-based image encoding methods. The encoding thereby usually is accomplished by modeling the segmented subjects and subsequent transmission of the modeling parameters for these segmented subjects.

After transmitting the image information from a transmitter to a receiver, the individual subjects of the image are in turn reconstructed in the receiver on the basis of the transmitted modeling parameters.

One possibility for modeling the subjects is a series development of the image function according to a set of suitably selected basic functions. The modeling parameters then correspond to the development coefficients of these image functions. Such a modeling of the image is the basis for transformation encoding. When individual, arbitrarily bounded subjects of the image are to be encoded, a transformation for segments with arbitrary, usually not convex bounds is required. Two basic approaches have previously existed for such a transformation.

In the method described in M. Gilge, T. Engelhardt and R. Mehlan, Coding of Arbitrarily Shaped Image Segments Based on a Generalized Orthogonal Transform, Signal Processing: Image Communication 1, 00. 153–180, October 1989, a given image segment is first embedded in a circumscribing rectangle having the smallest possible dimensions. A discrete cosine transformation (DCT) that is completely specified by the basic functions of the transformation can be recited for this rectangle. In order to match this transformation to the segment shape, the basic functions defined for the rectangle are successively orthogonalized with respect to the shape of the segment. The resulting orthogonal, shape-dependent basic functions then form the segment-matched transformation that is desired.

One disadvantage of this approach is that there is a tremendous demand for calculating capacity and memory for implementing this method. Further, with this known method no reliable statements can be made about the resultant transformation for data compression, since the transformation is essentially dependent on the orthogonalization sequence and, thus, on the specific implementation.

T. Sikora and Bela Makai, Shape-adaptive DCT for generic coding of video, IEEE Trans. Circuits and Systems for Video Technology 5, pp. 59–62, February 1995 describes a method wherein the given image segment is separately transformed according to rows and columns. To that end, all rows of the image segment are first aligned on the left and successively subjected to a one-dimensional horizontal transformation whose transformation length respectively corresponds to the number of picture elements in the corresponding row. The resultant coefficients are subsequently transformed a second time in vertical direction.

This method has the disadvantage that correlations of the brightness values for the picture elements (similarities of the picture elements) cannot be fully exploited due to resorting of the picture elements.

For improving this method T. Sikora, S. Bauer and Bela Makai, Efficiency of Shape-Adaptive 2-D Transforms For Coding of Arbitrary Shaped Image Segments, IEEE Trans. Circuits and Systems for Video Technology 5, pp. 254–258, June 1995 [3] describes a method wherein a transformation for convex image segment shapes adapted to a simple image model is implemented. However, only image segment shapes that exhibit no interruptions (holes) upon traversal of rows or columns are allowed.

In the above-described, known methods due to the variable transformation length, standard transformation methods or, respectively, standard modules can no longer be utilized for implementation of the transformation which is undesirable.

Standard image transformation methods are known, for example, from R. J. Clarke, Transform Coding of Images, Academic Press, London, pp. 72–134, 1985. Because standard image transformation methods can no longer be applied, substantial costs arise for encoding units that work according to the known, above-described methods.

The present invention specifies a method for processing picture elements of an image segment with an arbitrary shape that exhibits image segments of a target image segment shape. Standard image transformation methods and encoding devices are compatible and can continue to be utilized for implementation thereof. Other objects and advantages of the present invention will be apparent form the following summary and detailed description of the preferred embodiments when viewed in light of the drawings.

SUMMARY OF THE INVENTION

In the present invention, picture elements of an image segment to which brightness values are allocated are subjected to conformal imaging. One goal of this imaging is that at least the brightness values of the picture elements that are located at an edge of the image segment are imaged onto picture elements of an edge for a target image segment. After the brightness values have been subjected to this imaging, the brightness values are interpolated arbitrarily.

It is thus possible to also implement a subject-based image encoding with block-based image encoding methods without greater cost. Considerable cost savings are realized as compared to entirely new development of subject-based image encoders.

The present invention advantageously improves transformation results, not only for the brightness values of the edge picture elements of an image segment, but also for the brightness values of other picture elements of the image segment that are imaged. These are advantageously transformed into a region located between the area of the picture element that was allocated to the respective brightness value before imaging and the edge of the target image segment.

Additionally, it is desirable in the special case where the target image segment exhibits a rectangular shape, that the imaging of the brightness values takes place along a straight-line direction through the target segment in the straight-line direction for which the respective picture element whose allocated brightness value is imaged lies. This corresponds to that case where a block-based image encoding is to be subsequently applied to the picture elements of the target image segment. This simply corresponds to a "shift" of the brightness value along the corresponding straight line. What is especially advantageous about this aspect of the inventive method is the simplicity and, thus, the speed of implementing the invention.

Further simplification can be achieved in that conformal imaging ensues in such a way that the shift of the brightness values along the straight line does not take place only for the respective edge pixel. Rather, this occurs for all picture elements of the image segment, respectively proportional to an imaging factor that, for example, derives from the ratio of the size of the image segment to the size of the target image segment.

It is also advantageous that interpolation between the brightness values after the imaging takes place with an extremely simple and, thus, quickly implemented interpolation. This may be, for example, by a linear interpolation of the brightness values.

DETAILED DESCRIPTION OF THE PREFERRED EMBODIMENTS

Figure 1:
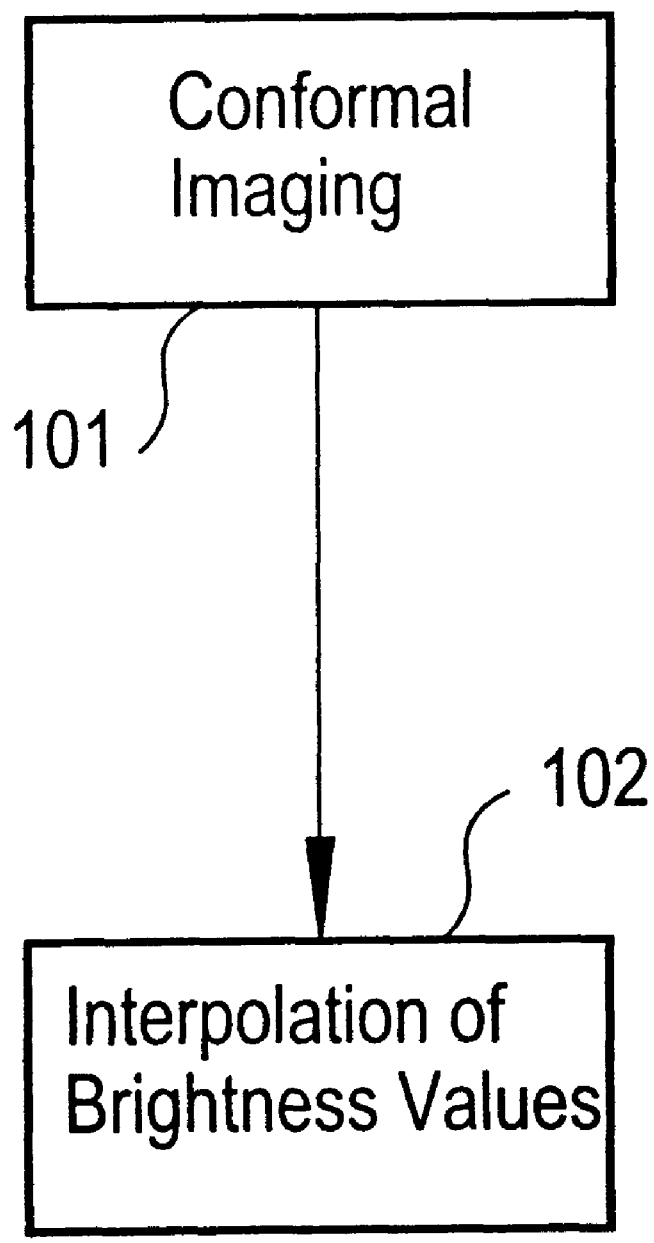
FIG. 1 illustrates a flowchart in which the individual method steps of the inventive method are shown.

In a first step 101, brightness values allocated to picture elements BP of an image segment S with a prescribable shape in a digital image B are subjected to a conformal imaging (see FIG. 1). The plurality of picture elements BP that the image segment S comprises is arbitrary. The conformal imaging takes place in such a way that at least brightness values of edge picture elements RBP of the image segment are imaged onto picture elements BP of a target image segment ZS that lie on the edge of the target image segment ZS. The edge picture elements RBP are those picture elements BP of the image segment S that respectively lie on the edge of the image segment S. After imaging has ensued, an interpolation of the brightness values is implemented 102 between the picture elements BP (see FIG. 1).

Figure 2:
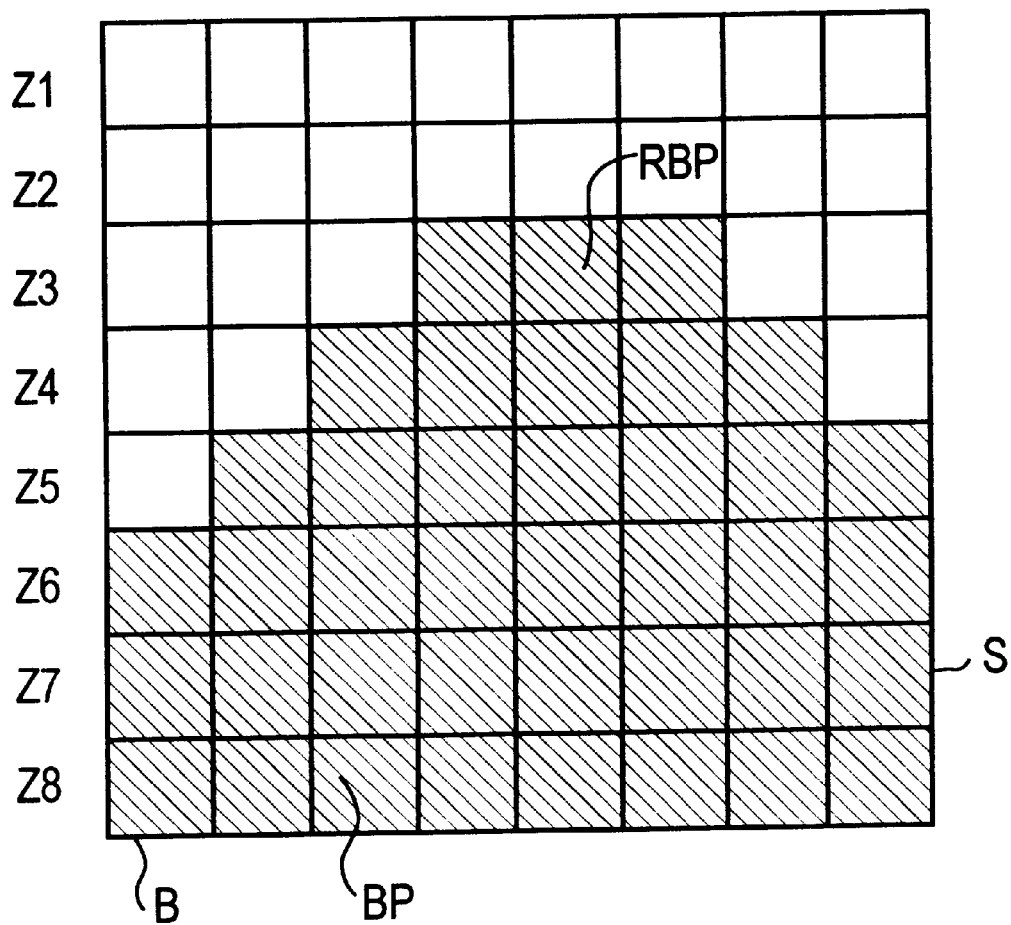
FIG. 2 illustrates an image with individual picture elements and an image segment.

FIG. 2 illustrates a trivial example where the digital image B comprises 8×8 picture elements BP in this specific instance. For the sake of clarity, FIG. 2 also shows an image segment S with picture elements marked by shading. This indicates that these picture elements BP belong to the image segment S.

Figure 3:
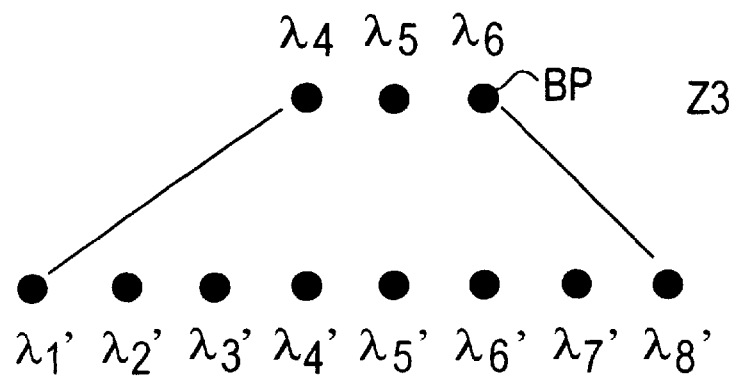
FIG. 3 illustrates picture elements and their corresponding brightness values of the image segment before and after implementation of conformal imaging.

In this simple exemplary case, the present invention is explained below only on the basis of three picture elements of a third image row Z3. As shown in FIG. 3, a respective brightness value and/or color value is allocated to the individual picture elements of the third image row Z3. Each brightness value or color value is indicated with the letter $\lambda$ and an unambiguous index that respectively corresponds to the column number in which the picture element is located within the digital image B. The three brightness values or color values $\lambda_4$, $\lambda_5$, $\lambda_6$ thus derive for the picture elements BP of the image segment S in the third picture row Z3. For simplification, these shall only be referred to as brightness values below. However, it will be recognized by those skilled in the art that the same also respectively applies to color values.

Since the target image segment ZS in this exemplary case comprises the entire width of the 8×8 image B, conformal imaging is performed in such a way that the brightness value $\lambda_4$ is imaged onto the picture element of the first column of the third image row Z3. This yields a transformed brightness value $\lambda_1'$ for the picture element BP of the first column in the third image row Z3. The brightness value $\lambda_1'$ is thereby roughly equal to the brightness value $\lambda_4$. The same fundamentally occurs as a result of the conformal imaging with the brightness value $\lambda_6$ with reference to the picture element BP in the eighth column of the third image row Z3. A new brightness value $\lambda_8'$ thus derives for the picture element BP located at the extreme right edge of the target image segment ZS.

This procedure, however, is only intended to illustrate the simple, trivial case. In general any conformal imaging can be utilized with the method. In this context, conformal means that the imaging is unambiguous, so that the implemented imaging can also be reversed.

The shape of the target segment ZS is also definitely not limited to a rectangular shape nor to a quadratic shape of the target image segment ZS. The shape of the target image segment is generally arbitrary. It is merely necessary to adapt the fundamental conformal imaging to the corresponding shape of the target image segment ZS.

Figure 4:
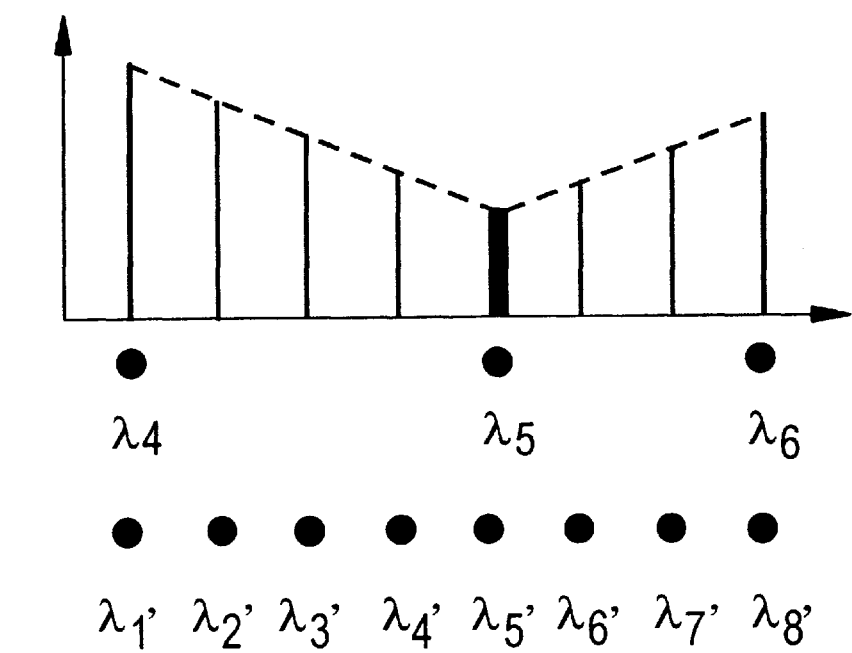
FIG. 4 is a diagram which illustrates an exemplary curve of the interpolation for the brightness values.
Figure 5:
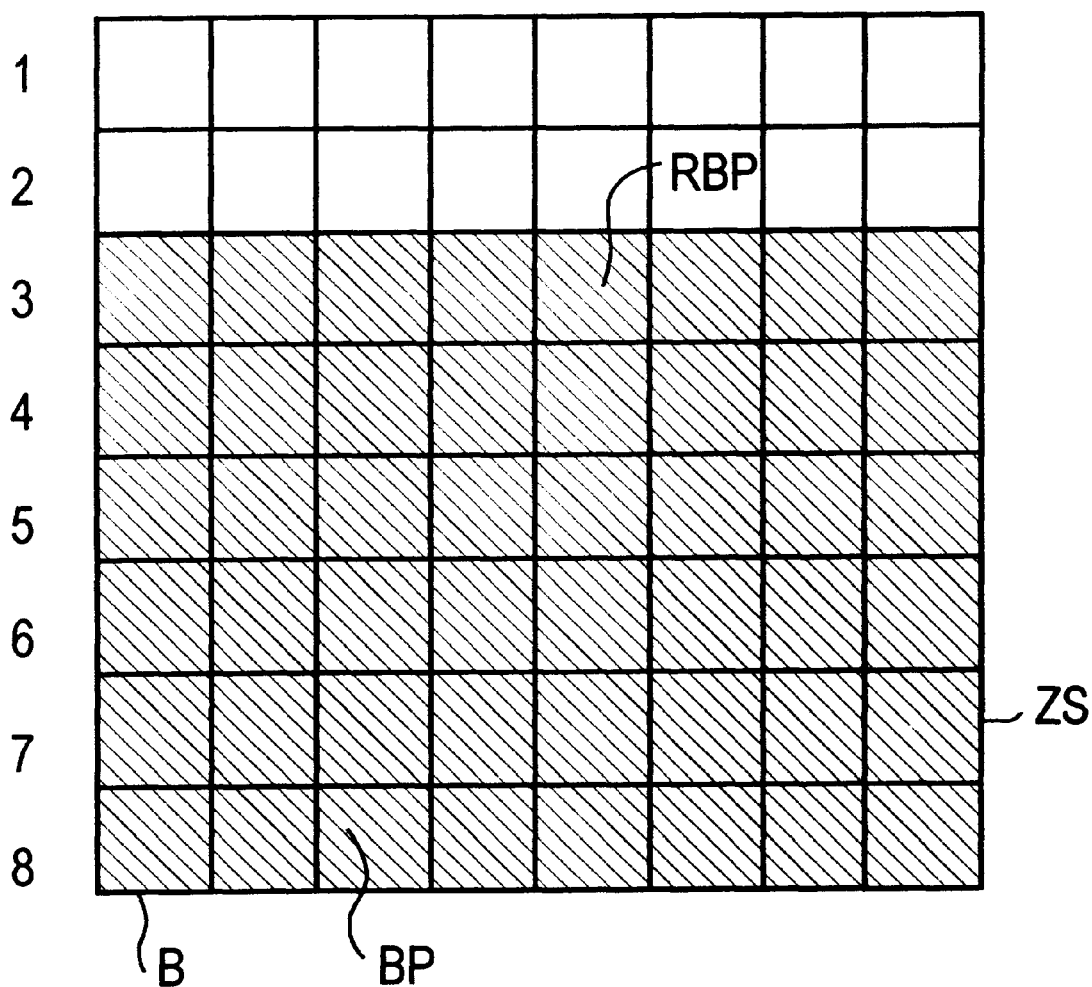
FIG. 5 illustrates a target segment.

The interpolation of the brightness values then takes place between the new brightness values $\lambda_1'$ and $\lambda_8'$ and, for example, an unmodified brightness value $\lambda_5$ that in this simple example exhibits the same brightness value for the corresponding picture element $\lambda_5'$. The respective brightness value after imaging $\lambda_4'$, $\lambda_5'$, $\lambda_5'$ is qualitatively sketched in a simple diagram set forth as FIG. 4.

The interpolation between these three brightness values in this simple example ensues linearly. The brightness values for the further picture elements of the target image segment deriving therefrom in equidistant intervals, is indicated by the values for $\lambda_2'$, $\lambda_3'$, $\lambda_4'$, $\lambda_6'$, $\lambda_7'$. Depending on the need for precision, interpolation of brightness values can be implemented with any arbitrary function. However, it is advantageous to linearly implement the interpolation in order to save calculating time because of the simplicity of linear interpolation.

It is desirable to first implement the above-described imaging in a first straight-line direction in order to then implement the imaging in a second straight-line direction that advantageously lies roughly perpendicular to the first straight-line direction.

The greatest variety of versions for conformal imaging are thereby provided. For the specific case of a rectangular target image segment ZS, an imaging factor A is determined for a straight-line direction from the imaging of the brightness values along the straight-line direction. Then, the individual brightness values of the image segment S are shifted along the straight-line direction proportionally to the imaging factor on the basis of the conformal imaging.

In general, the method can be imagined as an "inflating" of a balloon transformed onto a two-dimensional surface. This "inflating", for example, just happens to correspond to a shift of the brightness values along at least one straight-line direction for the specific case of the rectangular shape of the target image segment ZS. The straight-line direction can be arbitrarily selected. For example, the straight-line direction can be the diagonal of the target image segment ZS or a horizontal or a vertical of the target image segment ZS as well.

The imaging factor A then derives, for example, from:

$$A = n/m,$$

where n references a plurality of picture elements that lie on the straight line in the image segment S, and m references a plurality of picture elements that lie on the straight line in the target image segment ZS.

Special consideration may be potentially required for image segments S that exhibit a non-convex shape. In this case, for example, non-interconnected line sections must be imaged onto a complete line. In a variation of the method, this can occur when two image sub-lines that are not connected to one another are stretched according to their size relationship. Alternatively, this may occur with an interpolation of the brightness curve over the gap between the two sub-lines. Advantageously, the sequence and the direction of the imaging should be selected in such a way that no brightness discontinuity of the brightness values can occur at a transition point. This may be, for example, a connecting point of the first sub-line section and a second sub-line section.

Further, the inventive method is in no way limited to discrete cosine transformation (DCT )but can also be very advantageously utilized in all other known encoding methods. For example, this includes what is referred to as wavelet transformation or sub-band imaging encoding on the basis of vector quantization .

It is thereby especially advantageous to apply the method to an entire segmented subject within the framework of a wavelet transformation. By conformal imaging of the brightness values, this subject could be brought into a shape that is especially favorable for wavelet transformation. Existing knowledge about advantages of an image encoding method can thus already be processed in the framework of this imaging as a result of the inventive method.

Figure 6:
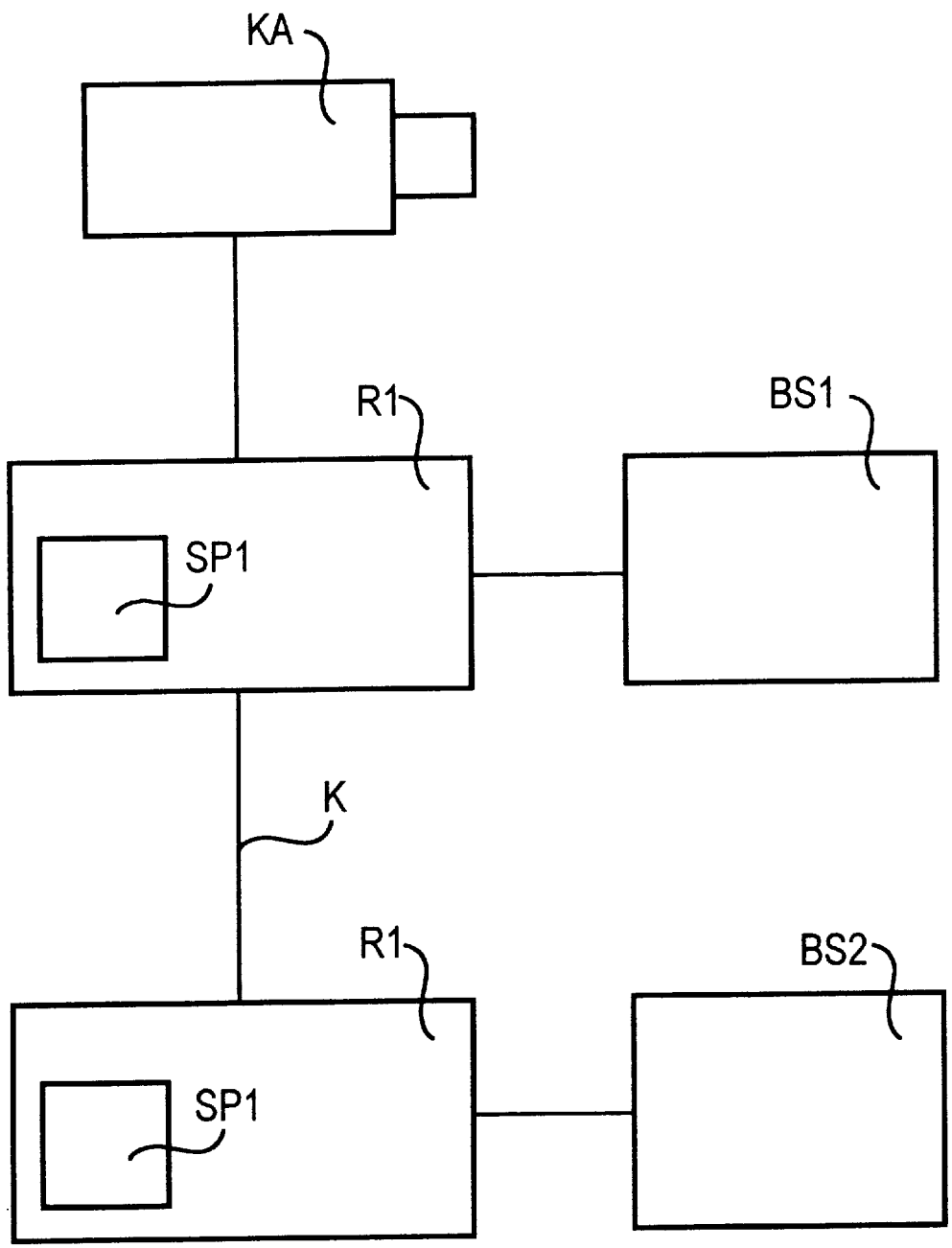
FIG. 6 illustrates an exemplary structure for carrying out the invention.

FIG. 6 shows, among other things, a computer R1 with which the inventive method is implemented. Further, FIG. 6 shows a camera KA with which a sequence of images is recorded. This sequence is converted into a sequence of digital images B in the computer R1. The digital images B are stored in a memory SP1 of the computer R1. Further, a picture screen MS1 is provided for the computer R1 in this arrangement.

For transmission of the digitized image B, the inventive method is applied to the individual image segments S before the transmission of the digitized image B. Standard image transformation encoding is then applied to the target image segments ZS. The coefficients resulting therefrom are transmitted via a channel K to a second computer R2, where they are stored in a second memory SP2. After implementation of the inverse image transformation encoding and of the inverse conformal imaging, the digitized image B is in turn reconstructed in the second computer R2 and displayed to a user on the second picture screen BS2.

Figure 7:
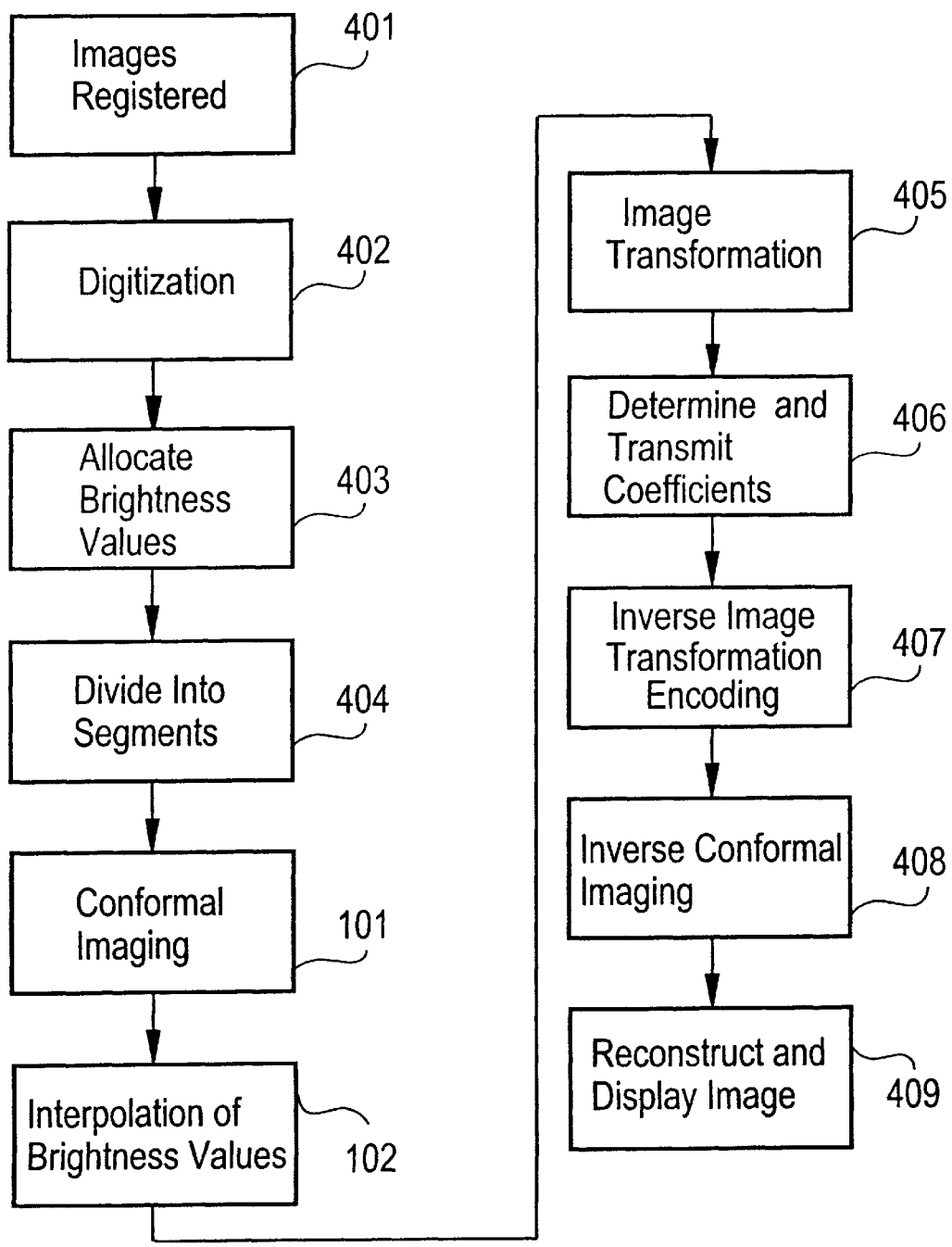
FIG. 7 is a flowchart which illustrates additional method steps of the present invention.

FIG. 7 shows additional variations of the inventive method. For example, one or more images are registered 401 with the camera KA. The image or, images are digitized 402 in the computer R1, whereby the individual picture elements BP of the image B have brightness values allocated 403 to them. The digitized image B is divided 404 into individual image segments S. The inventive method steps 101 and 102 are implemented for the individual image segments S that are to be respectively imaged onto a prescribable target image segment S. After implementation of the inventive method, the corresponding standard image transformation method is applied 405 to the brightness values allocated to the picture elements BP.

In a further step 406, the coefficients determined therefrom are transmitted from the computer R1 to the second computer R2 via the channel K over which the two computers are coupled to one another.

The coefficients are subjected 407 to the inverse image transformation encoding in the second computer R2. Subsequently, the inverse conformal imaging is applied 408 to the results of the inverse image transformation encoding. After inverse conformal imaging, it is now possible to reconstruct the digital image B in a last step 409 and to display the reconstructed digital image B to a user on the picture screen BS1 or the second picture screen BS2.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for processing picture elements of an image segment of an arbitrary shape, comprising the steps of:

conformal-imaging brightness values of picture elements located at an edge of the image segment onto picture elements of an edge of a target image segment of prescribable shape, the target image segment and the image segment having different shapes;

interpolating brightness values of picture elements between the picture elements at the edge of the target image segment;

coding the target image segment by use of a transformation coding; and performing the sequence of steps set forth above on a plurality of image segments from separate images of an image sequence.

2. A method for processing picture elements according to claim 1, comprising an additional step of imaging additional brightness values that do not lie on the edge of the target image segment onto picture elements of the target image segment.

3. A method for processing picture elements according to claim 1, comprising the additional steps of:

imaging additional brightness values for picture elements of the image segment onto picture elements of the target image segment that lie between the edge of the target image segment and the picture element to which the corresponding brightness value was allocated before the imaging.

4. A method for processing picture elements according to claim 1, wherein the target image segment comprises a rectangular shape.

5. A method for processing picture elements according to claim 1, wherein the step of imaging comprises imaging along at least one straight line through the target image segment of the picture element whose allocated brightness value is imaged lies.

6. A method for processing picture elements according to claim 3, wherein the imaging of the additional brightness values takes place proportional to an imaging factor related to the imaging of the brightness values along the straight-line direction.

7. A method for processing picture elements according to claim 6, wherein the imaging factor (A) satisfies the ratio:

$$A=n/m,$$

where n identifies a plurality of picture elements that lie on the straight line in the image segment, and m references a plurality of picture elements that lie on the straight line in the target image segment.

8. A method for processing picture elements according to one of the claim 5, wherein the imaging takes place along at least a first straight-line direction and a second straight-line direction.

9. A method for processing picture elements according to claim 8, wherein the first straight-line direction is substantially perpendicular to the second straight-line direction.

10. A method for processing picture elements according to claim 1, wherein the step of interpolating comprises a step of linear interpolating.

* * * * *